Figure 1:
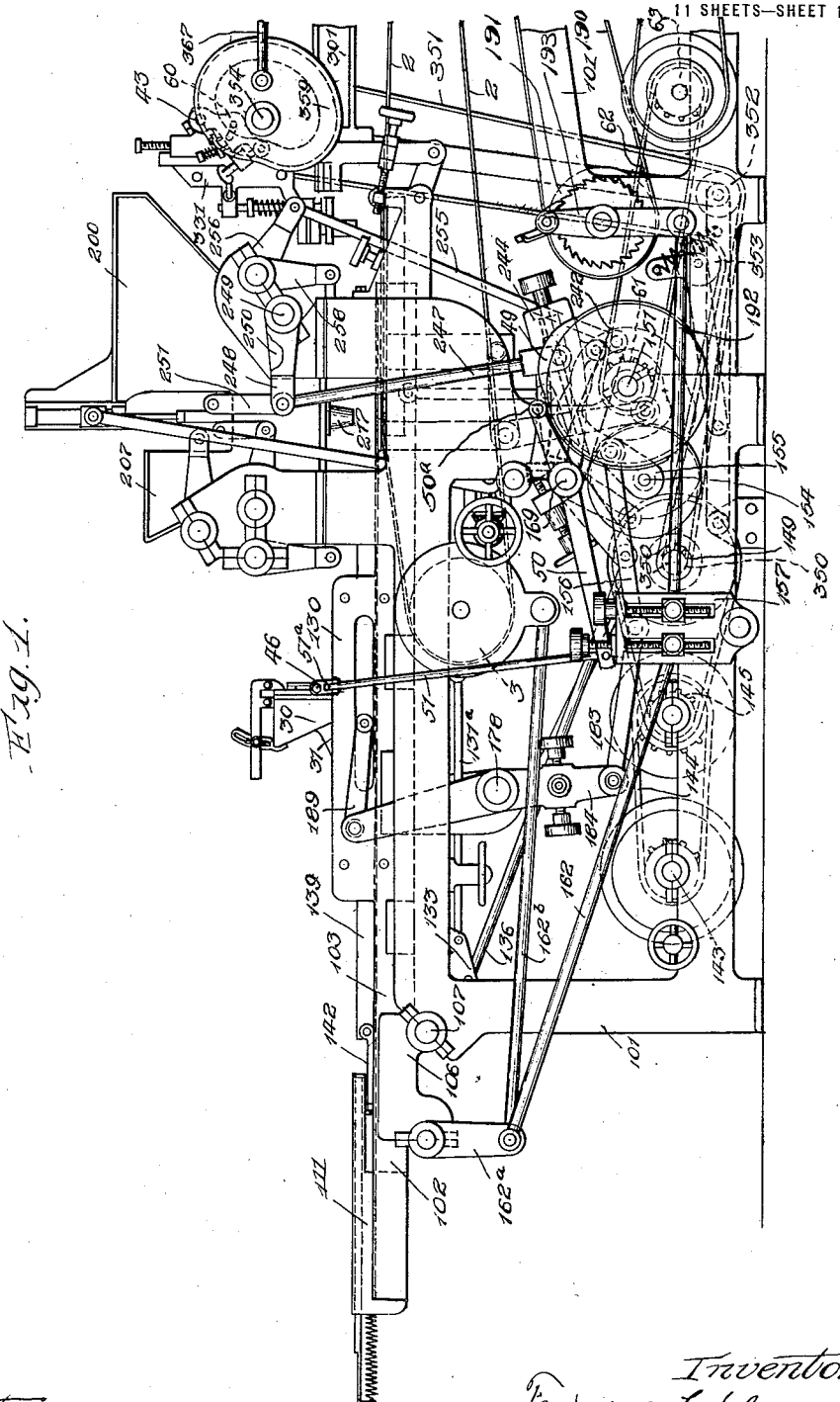

F. G. SALERNO.
DEPOSITING MACHINE.
APPLICATION FILED OCT. 28, 1916.

1,274,606.

Patented Aug. 6, 1918.
11 SHEETS—SHEET 5.

Witness:

Inventor,
Ferdinando G. Salerno
By Rector, Hibben, Davis & Macauley Attys.

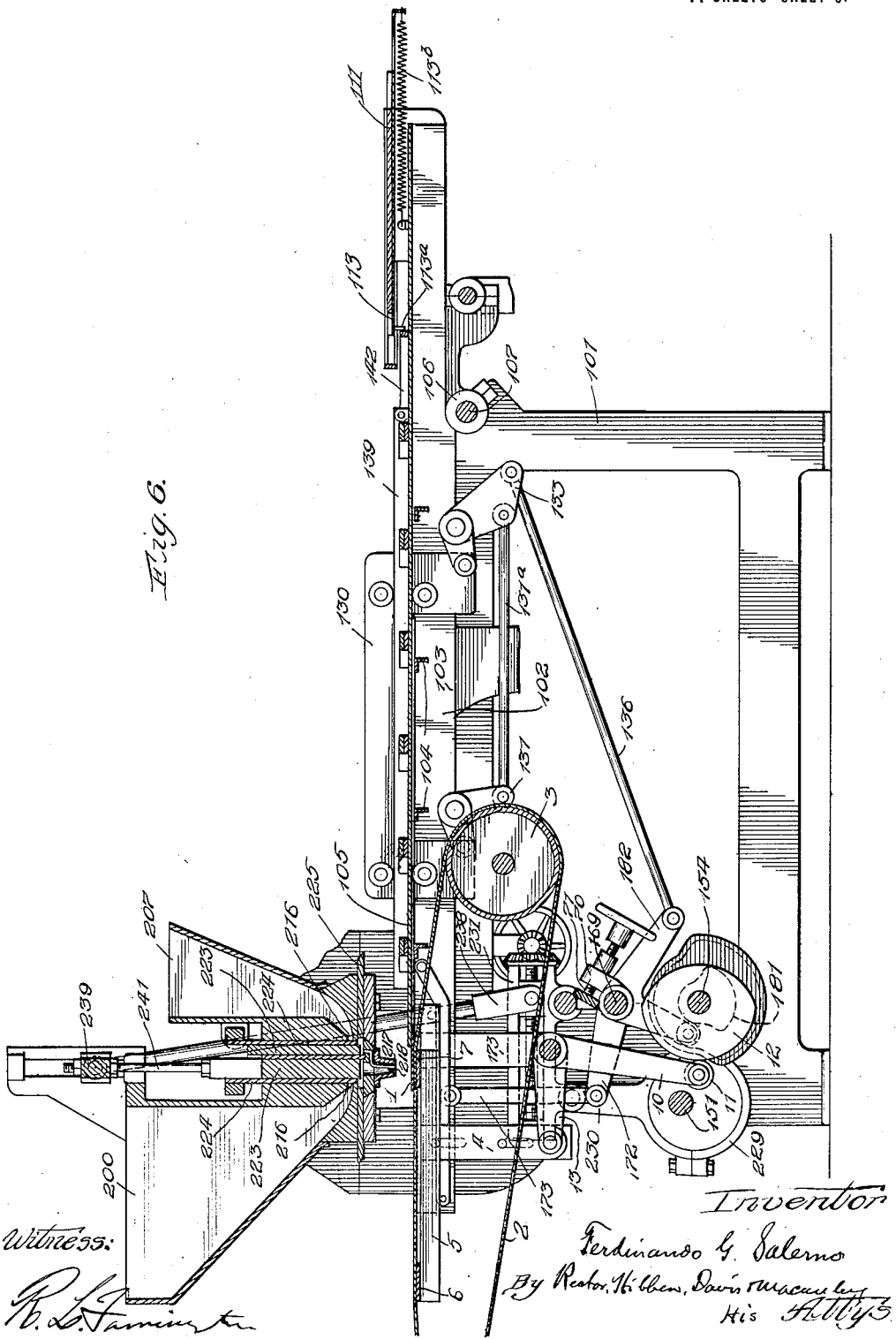

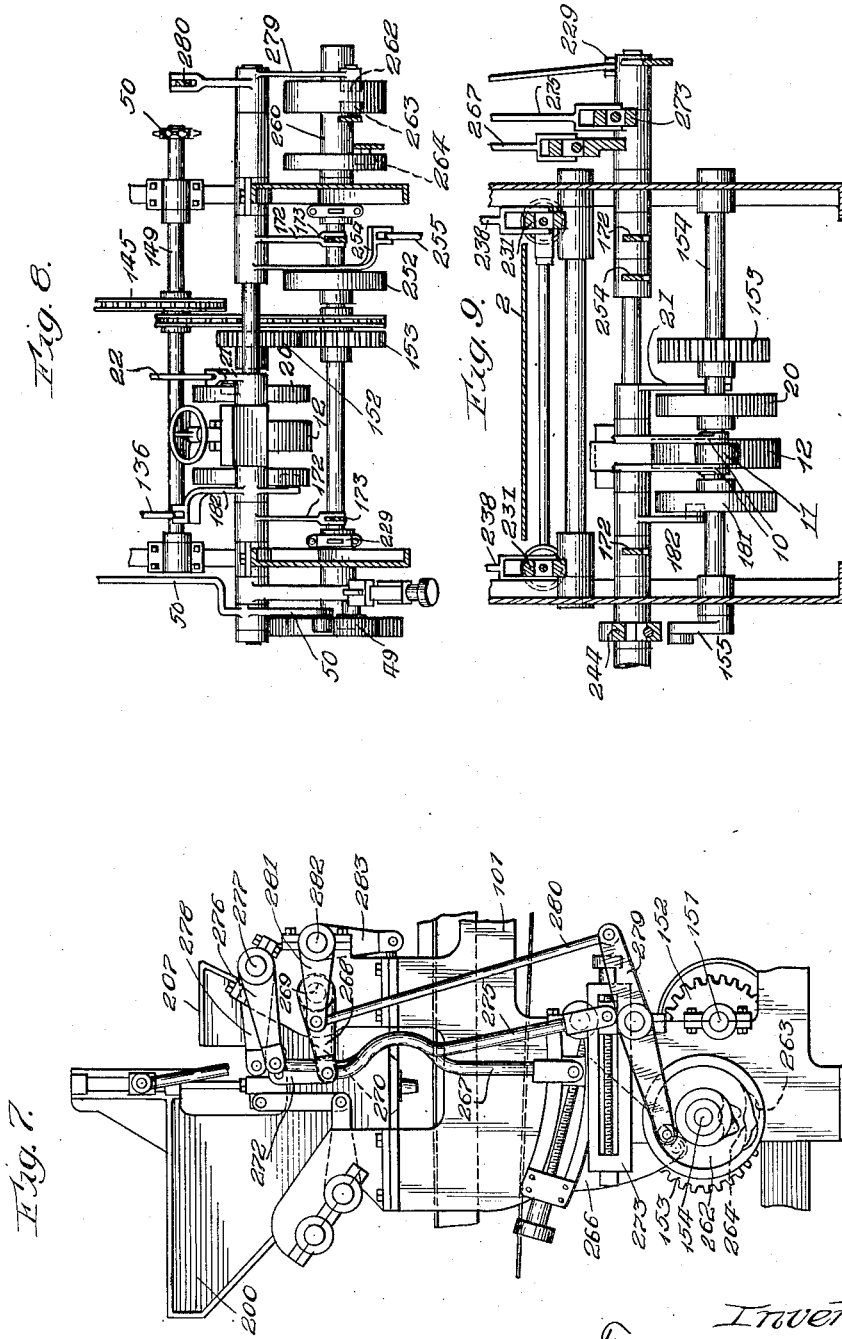

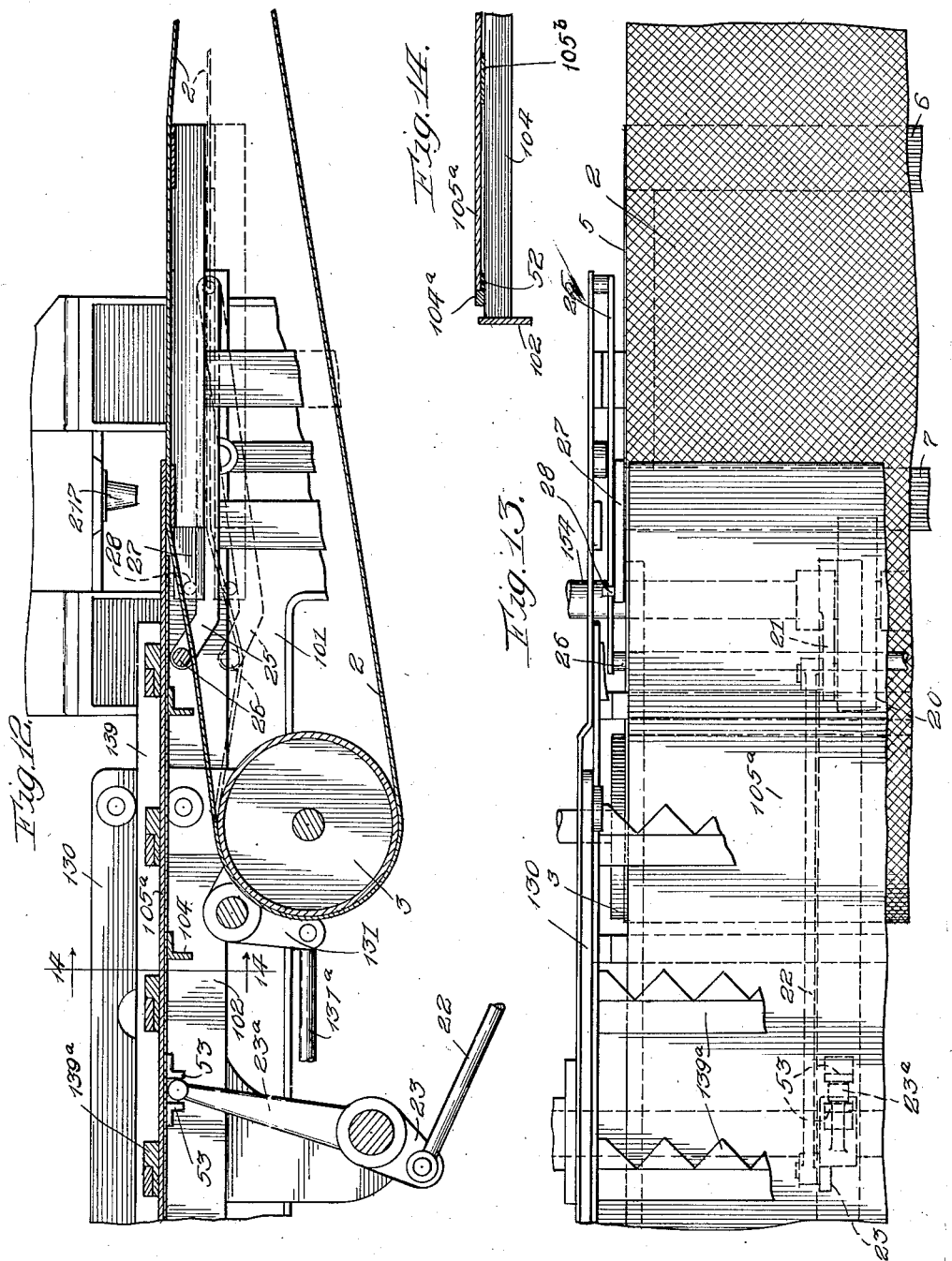

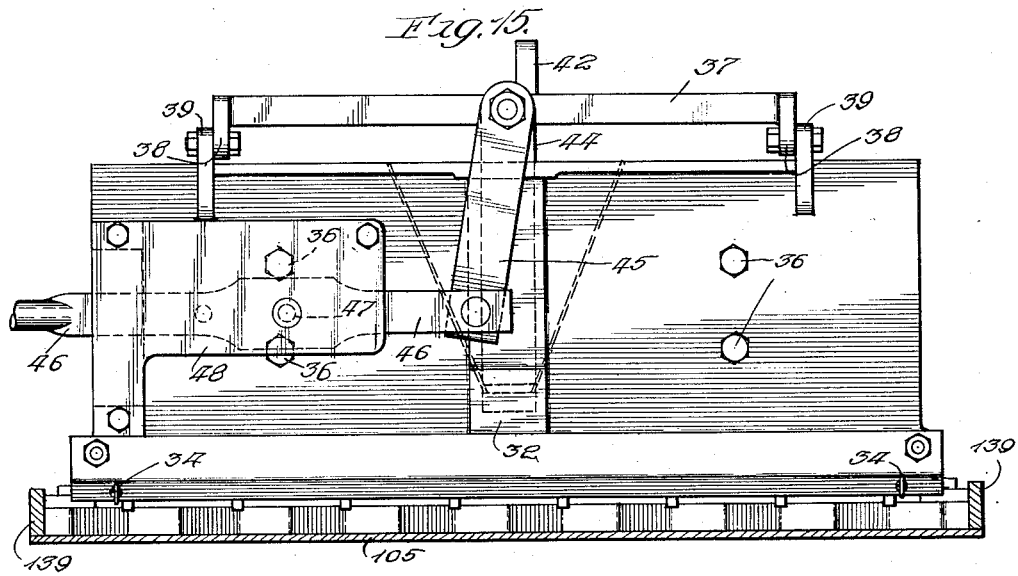
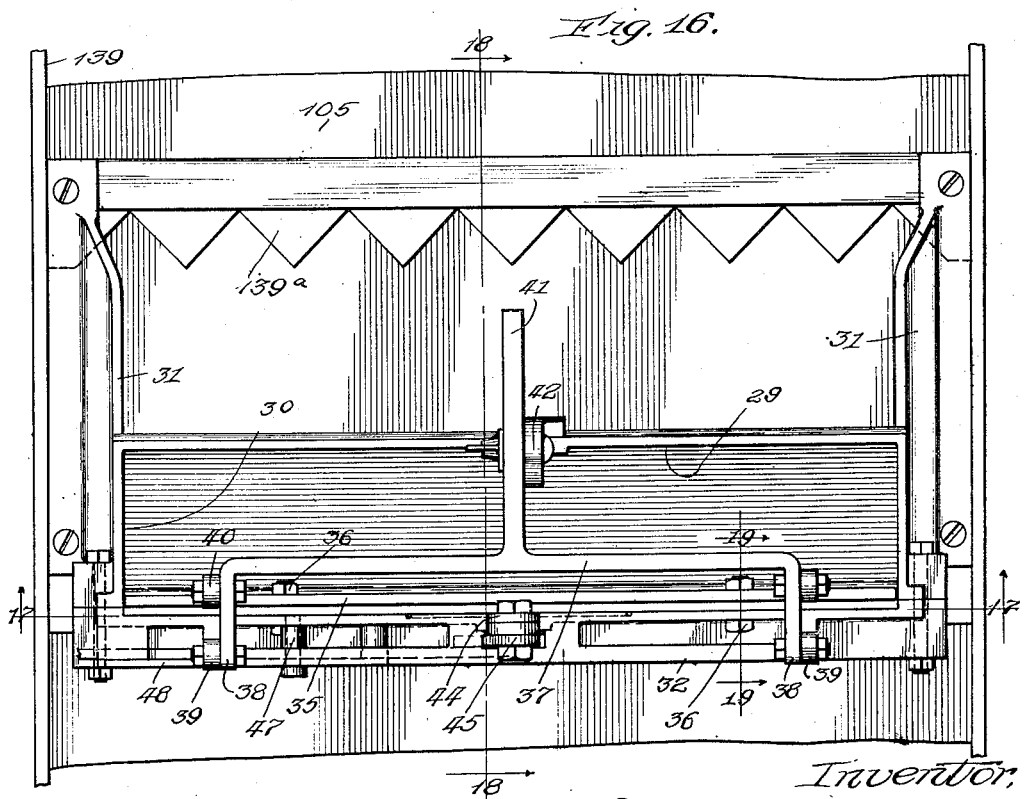

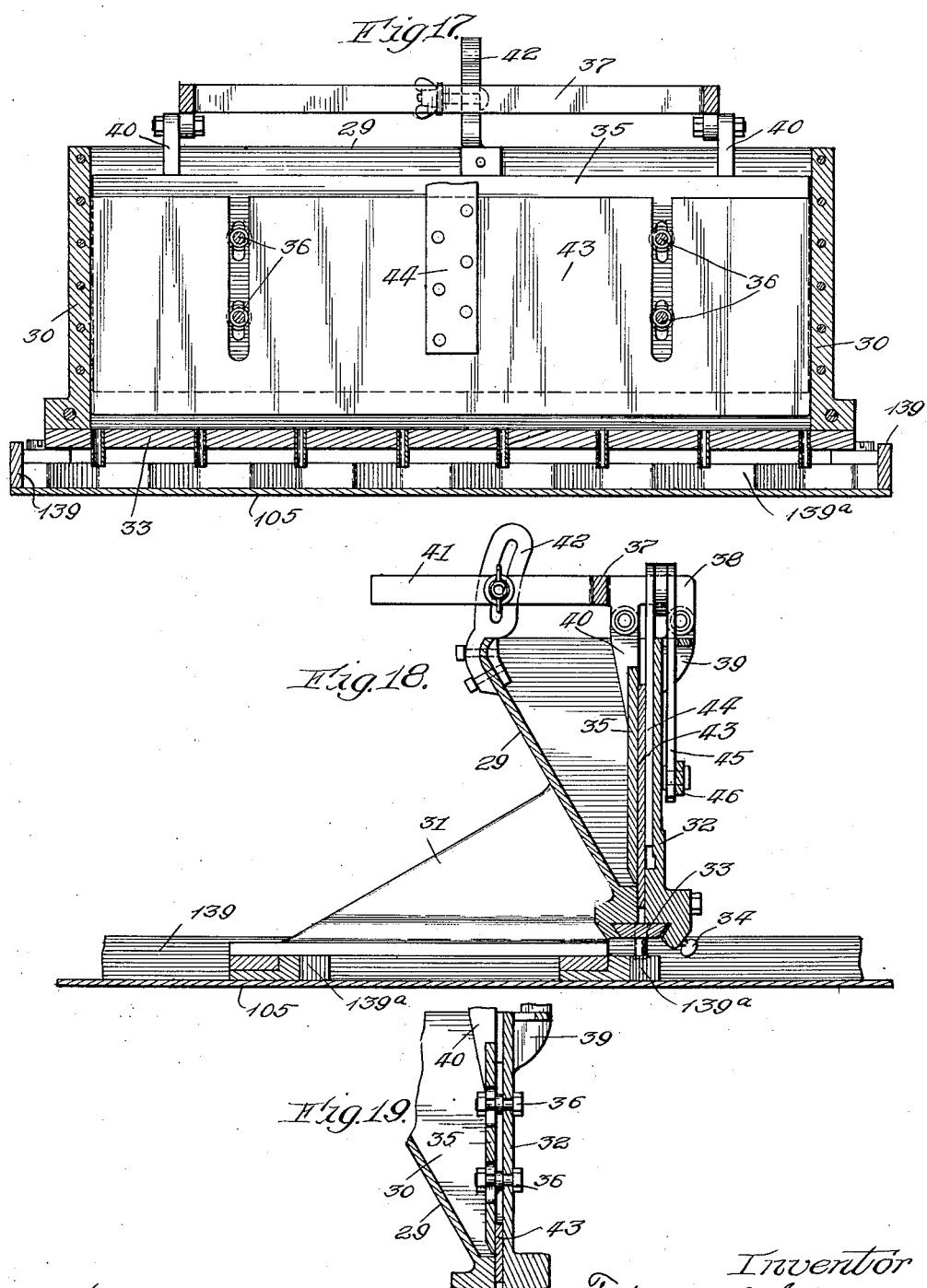

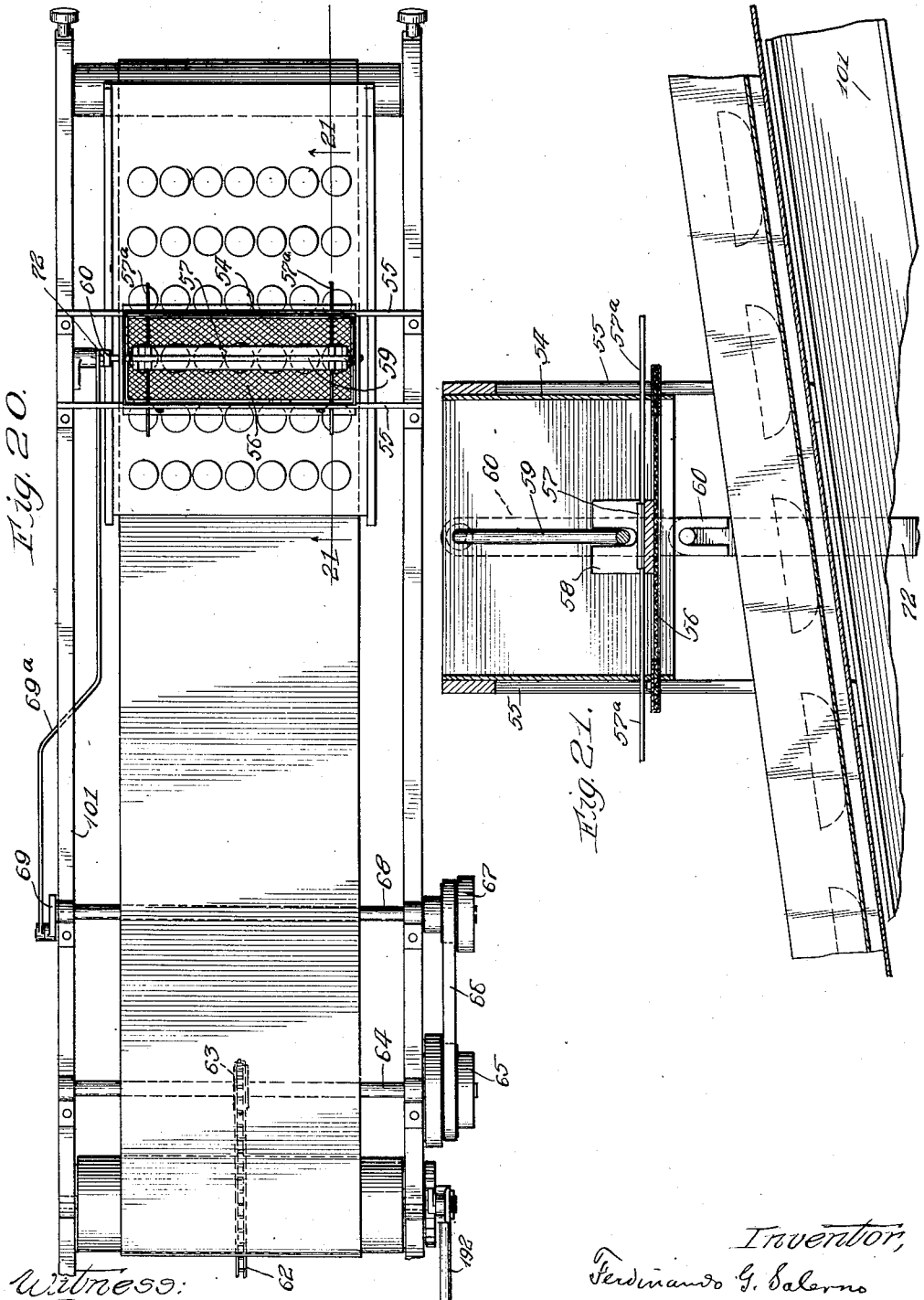

UNITED STATES PATENT OFFICE.

FERDINANDO G. SALERNO, OF CHICAGO, ILLINOIS.

DEPOSITING-MACHINE.

1,274,606. Specification of Letters Patent. Patented Aug. 6, 1918.

Application filed October 28, 1916. Serial No. 128,306.

*To all whom it may concern:*

Be it known that I, FERDINANDO G. SALERNO, a citizen of the United States, residing at Chicago, in the county of Cook and State of Illinois, have invented certain new and useful Improvements in Depositing-Machines, of which the following is a specification.

In my pending application for Patent No. 834,780, filed April 27, 1914, I have described a machine which is adapted to make deposits of any desired plastic or semi-fluid confection upon the top of flat cakes or wafers fed in rows through the machine upon the top of a conveyer belt; and in another pending application for patent, filed by me on August 12, 1916, Serial No. 114,571, I have described said machine combined with and embodying an improvement consisting of additional mechanism whereby the machine is adapted to deposit nut kernels, or wafers, or cakes, on the top of the deposits of confection, in order to form a variety of fancy wafers and sandwiches. One object of my present invention is to modify and improve the machine described in said two prior applications and attain a high degree of accuracy and certainty in the organization and operation of the modified structure, and another object is to incorporate in the machine mechanism by which the machine is adapted for a greater variety of work, and in general to produce a more complete and efficient machine of the character and construction hereinafter described. Its novelty, as compared with my previous machines described in the above-mentioned pending applications and with prior machines known to me, relates more particularly to transfer mechanism for receiving cakes fed along the surface of a stationary feed table and transferring them onto the surface of a transfer belt, in connection with means for raising and lowering said belt periodically and in sychronism with confection-depositing and nut or wafer-depositing mechanisms, whereby the operation of the machine will be continuously carried on in the manner hereinafter described; to supplemental or additional removable depositing mechanism; and to mechanism for sprinkling the cakes with any desired dry shredded or comminuted material, after the deposits of confection (and nut kernels upon the confection, if desired) are made upon the wafers. With the objects above mentioned in view my invention consists in the new organization of parts and novel and improved mechanism which I have devised and which is hereinafter more particularly described, the essential elements of the same being pointed out in the appended claims.

Figure 2:
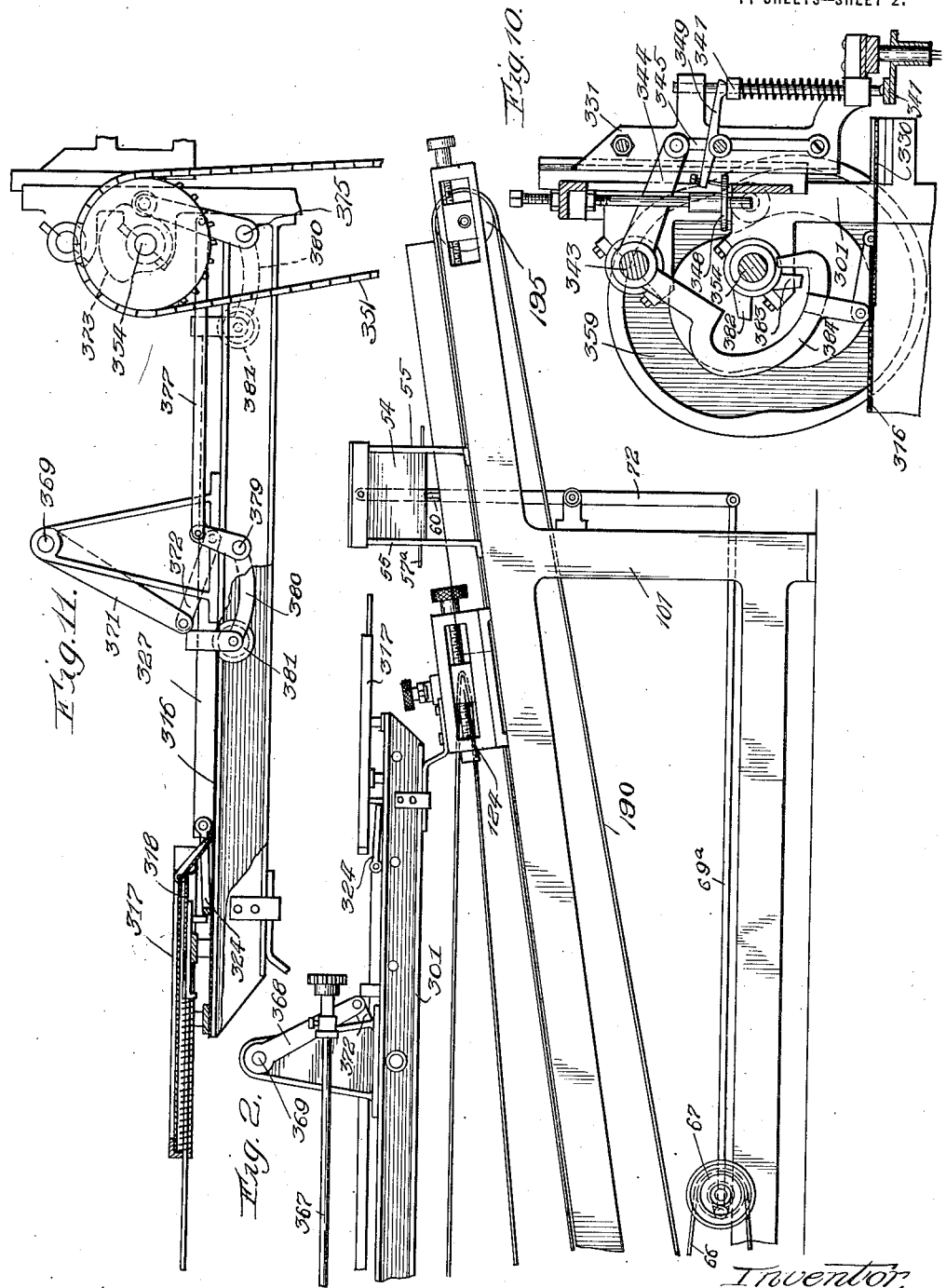
Figure 3:
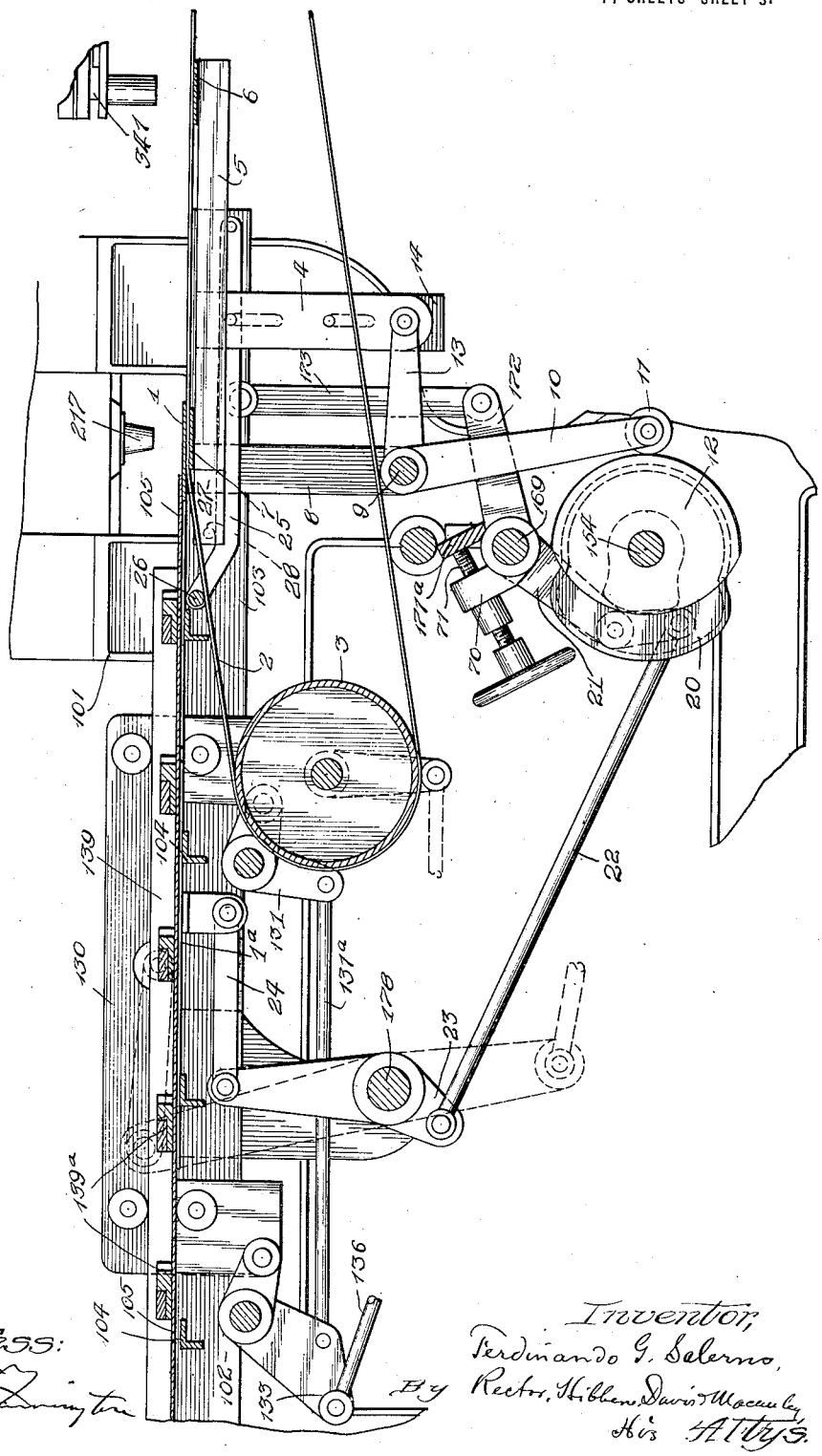
Figure 4:
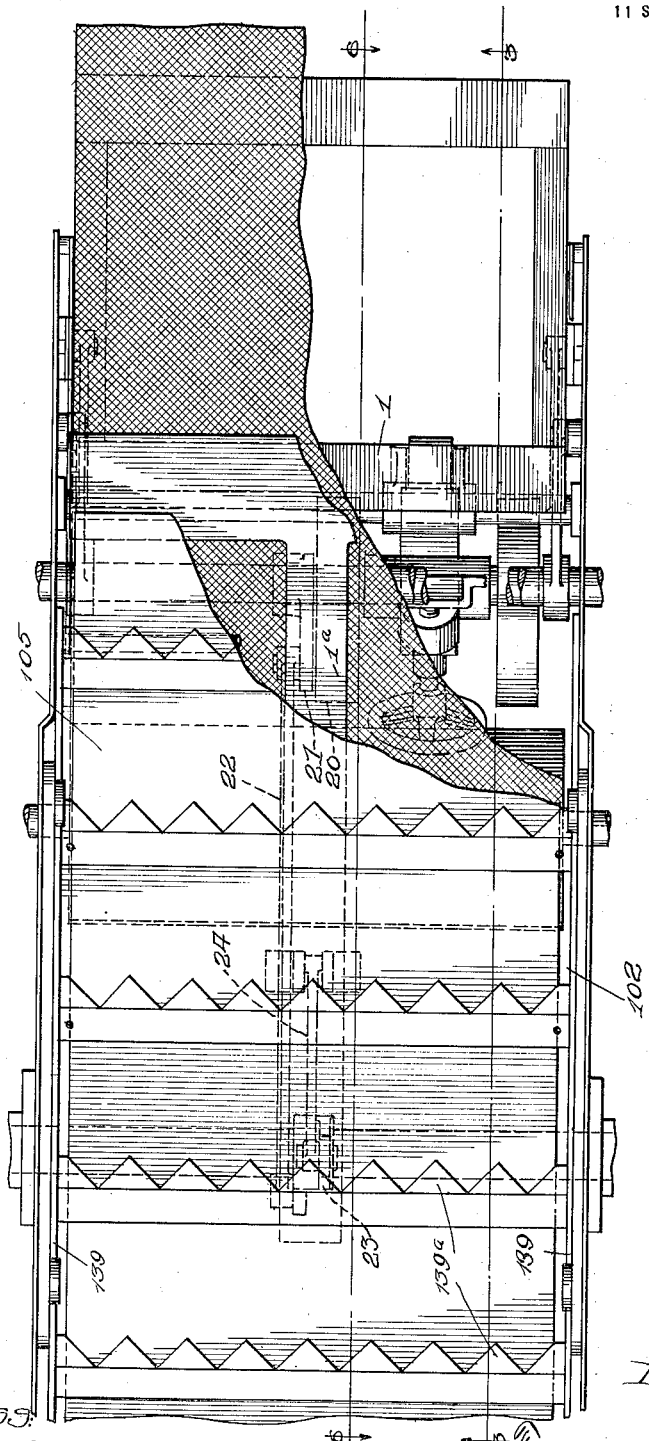
Figure 5:
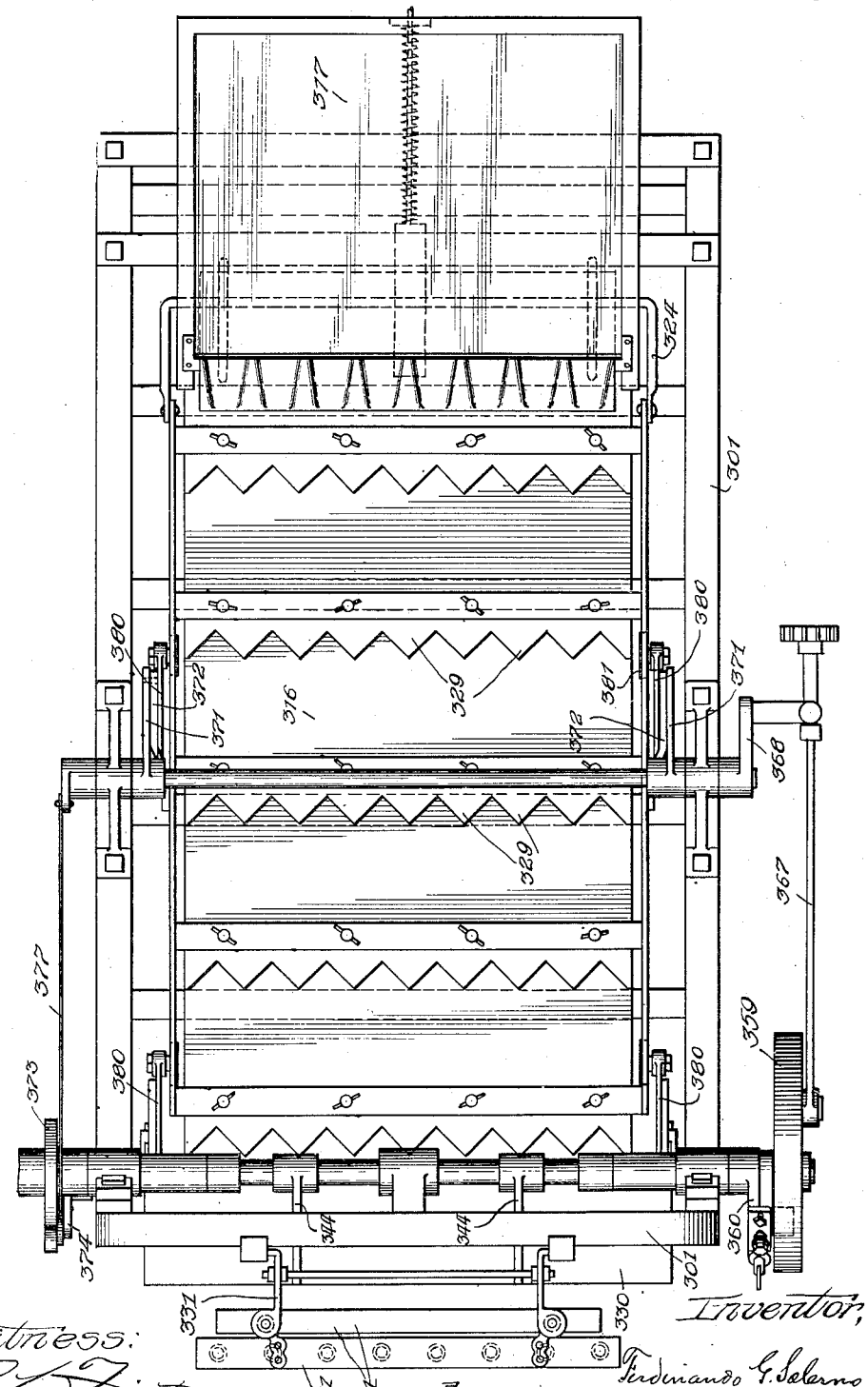

In the drawings Figure 1 is a right-side elevation of the rear and central portion of the machine; Fig. 2 is a similar elevation of the front end of the same; Fig. 3 is a section on the line 3—3 of Fig. 4; Fig. 4 is a plan view of the feed table and feeding frame for feeding cakes to the depositing mechanism, showing part of the transfer belt, with parts of the table and belt broken away to exhibit parts underneath; Fig. 5 is a top plan view of the supplemental frame and parts carried by it constituting the additional mechanism for depositing wafers on the deposits of confection to form sandwiches; Fig. 6 is a longitudinal vertical section of the rear portion of the machine on the line 6—6 of Fig. 4; Fig. 7 is a left-side elevation of the central part of the machine; Fig. 8 is a top view of two cam shafts near the base centrally of the machine; Fig. 9 is a vertical cross-section taken centrally of the lower part of the machine, said two last mentioned figures showing the arrangement of cams and gears for the operating connections; Fig. 10 is a view showing the cake-transfer frame of the sandwich mechanism and a hooked cam arrangement for operating a reciprocating slide forming part of such mechanism; Fig. 11 is a left side view of a portion of the sandwich mechanism; Fig. 12 is a fragmentary vertical longitudinal section of the central portion of the machine, showing a modified construction of the feed table; Fig. 13 is a plan view of part of the same; Fig. 14 is a detail on the line 14—14 of Fig. 12; Fig. 15 is a front view (looking toward the rear of the machine) of a supplemental and removable depositing mechanism; Fig. 16 is a plan view of the same; Fig. 17 is a vertical section of the same on the line 17—17 of Fig. 16, some of the parts being shown in elevation; Fig. 18 is a vertical section on the line 18—18 of Fig. 16; Fig. 19 is a fragmentary view on the line 19—19 of Fig. 16; Fig. 20 is a plan view of the front portion of the machine illustrating more particularly the mechanism for sprinkling shredded material upon the top of wafers in trays upon the delivery belt, and Fig. 21 is a vertical section on the line 21—21 of Fig. 20.

The same letters of reference indicate the same parts in all the figures of the drawings.

The general organization and mode of operation of my improved machine may first be briefly outlined as follows: The previously formed cakes which are to be operated upon are manually fed by attendants from a supply table arranged near one end of the machine (which for convenience will be termed the rear end) onto a reciprocating slide or shutter mounted slightly above the surface of a stationary feed table. This shutter is arranged to be intermittently retracted in the operation of the machine to drop the wafers, a cross row at a time, upon the surface of the table. The successive rows so deposited at the rear end of the table are intermittently fed forward by the reciprocations of a feeding frame having a gang of notched cross-bars and mounted to have a four-way movement above and adjacent the surface of said table. The additional or supplemental depositing mechanism is mounted upon and therefore travels as one with the feeding frame, and is arranged with its row of nozzles in such position relative to a notched cross-bar of the frame that the nozzles will be in alinement with the cakes shifted by such bar. The forcing means are timed to deposit charges of confection on the cakes while they are being moved along the table and before they reach the front end of the feed table and the nozzles of the main depositing mechanism. At the front end of the table is arranged a shutter or slide which lies immediately above the the surface of an endless transfer belt, the rear end of which belt passes around a feed drum arranged below the forward end of the stationary table and the front end of which passes around a narrow rounded cross bar adjustably secured in stationary position in the forward part of the frame of the machine. In the operation of the machine the front cross-bar of the feeding frame operates to move a row of cakes,—which has, or may have, received preliminary charges of confection from the supplemental depositing mechanism,—from near the front of the feed table forwardly onto the shutter or slide and into alinement with the row of nozzles of the main forcing mechanism through which the principal charges of confection are deposited. The rearward movement of the shutter operates to drop the row of wafers onto the top surface of the transfer belt, and the forcing mechanism then operates to deposit charges of confection on the wafers.

The feeding movement of the belt carries forwardly the rows of wafers which have thus been successively acted upon into alinement with groups of needles on a row of cake-transferring pins by which wafers or nuts are superposed upon the deposits of confection to make "sandwich" or similar fancy goods. Under the top reach of the rear portion of the transfer belt is arranged a lifting mechanism which includes two lifting bars, one in alinement with the nozzles of the forcing mechanism and the other with the groups of needles on the cake-transferring pins of the sandwich-forming mechanism, these bars being operated in unison to raise and lower the top portion of the belt a short distance synchronously with the operation of the depositing and sandwich-forming mechanisms.

Below and forward of the feed belt is arranged a delivery belt running around two drums, one a feed drum near the center of the machine and the other an idler drum at the front end of the machine. Trays are deposited by attendants of the machine on top of the delivery belt back of the front end of the transfer belt, which trays are carried forwardly in close proximity to such end, so that the feeding movements of the two belts will result in the finished wafers being automatically delivered onto the forwardly moving trays. Near the forward end of the machine and just above the delivery belt is arranged the mechanism for sprinkling shredded or grated material upon the tops of the wafers as they are carried along in the trays upon the delivery belt, the trays being removed from the front end of such belt and usually stacked until the confection has hardened sufficiently to permit the goods to be packed.

Inasmuch as many of the parts of the present improved machine are identical with parts of the machines described in my two before-mentioned applications, but a brief and abbreviated description of such parts will be given, those parts only being herein described in detail as are novel, or differ in construction and arrangement from parts of my prior machines.

Proceeding now to a more detailed description of the construction of my improved machine, the frame 101 of the machine may be of any suitable design and construction, so framed as to adequately support the various movable elements. The stationary feed table 102 may be conveniently formed of side members 103 and cross members 104 of flanged metal, and a flat top sheet or plate of metal 105 affording a smooth and sanitary surface for the support of the cakes; see Figs. 1, 3, 4 and 6.

In order to provide for an exact adjustment of the front end of the table vertically so that the cakes will approach the depositing nozzles in the proper plane, the rear end of the table is equipped with a pair of opposite brackets 106 formed with hub bearings suitably journaled upon a cross rod 107 of the frame, and the front end is supported by a pair of opposite links 173, the lower ends of which are pivoted to a pair of rock arms 172 secured to a rock shaft 169 journaled in the frame of the machine; see Figs. 1, 3 and 6. This rock shaft has secured to it a block 70 formed with a threaded lug which is engaged by a screw 71 equipped with a hand wheel by which it may be operated, the end of the screw bearing against a stationary abutment 171$^a$ consisting of a cross-bar, the ends of which are secured to the sides of the machine frame. By manipulation of the hand wheel it is obvious that the front end of the table can be accurately adjusted in a vertical direction.

Above the rear end of the feed table 102 is mounted the distributing or supply table 111, see Figs. 1 and 6, from which attendants supply cakes to the feed table in rows by arranging them upon a reciprocating slide 113 mounted at the front of the supply table, this slide acting to drop the cakes onto the rear end of the feed table as it is intermittently moved rearwardly beneath the supply table, in a manner hereinafter explained.

At the front end of the feed table a plate 1, arranged to be reciprocated through connections which will also later be described, is slidingly mounted in a plane just below the plane of the feed table.

The rear end of the transfer belt 2 passes around a driving drum 3 located under the feed table near its front end, and the front end passes around a narrow cross-bar 124, the ends of which are adjustably secured to the main frame of the machine. The top reach of the belt is given a slight vertical movement by a lifting frame which comprises a pair of T-shaped slides 4 arranged at opposite sides of the machine, the top members 5 of the slides being connected by a front cross-bar 6 and a rear cross-bar 7 extending across the machine and secured to the ends of such top members 5. The rear cross-bar is in alinement with the depositing nozzles and the front with the groups of needles of the cake-transfer mechanism.

To compensate for a slackening of the transfer belt 2 which would otherwise occur in lowering the lifting frame from upper to lowermost position, I employ a bail comprising side bars 25 pivoted to the side bars 103 of the feed table near their front end, and a cross-rod 26 which is arranged to contact the top surface of the top reach of the belt between the feed drum 3 and the cross-bar 7 of the lifting frame. The lifting frame has secured to its sides plates 27 equipped with lugs 28 arranged to contact the side bars 25 of the bail and carry them downwardly as the frame falls, the adjustment and arrangement of the parts being such as to prevent any slackening of the belt and maintain a practically uniform tension upon it throughout its range of movement.

The delivery belt, indicated by the reference numeral 190, runs over a feed drum 191 at its rear and lower end, and at its front end over an idler drum 195 adjustably mounted in the framework of the machine. The feed drum is given a step-by-step movement through a pawl and ratchet connection hereinafter described.

Forwardly of the feed table 111 and between the trap slide 113 and depositing mechanism, a spacing and feeding frame is arranged to move the rows of cakes successively dropped by the slide forwardly over the surface of the feed table, see Figs. 1, 3, 4 and 6. This feeding frame includes side bars 139 and a gang of notched cross-bars 139$^a$ and through suitably timed connections hereinafter described, such frame is given a horizontal sliding movement in a lifting frame 130 which is given a rising and falling movement with respect to the feed table, so that a four-way movement is imparted to the feeding frame to move the cakes in rows forwardly along the table, then move rearwardly and rise to clear the next rows to the rear, then fall behind them and move forwardly again, and so on.

A bail 142 is pivoted to the rear of the frame 139, and so arranged as to slide back and forth under the slide 113, see Fig. 6. At its rearward stroke it contacts a lug 113$^a$ on the side to move it rearwardly against the stress of a spring 113$^b$ and drop the row of cakes thereon onto the table, and at its forward stroke the cakes are pulled forwardly into position to be acted upon by the rearmost bar 139$^a$ of the feeding frame at the next reciprocation of such frame.

The additional or supplemental depositing mechanism mounted on the feeding frame 139 is preferably detachably secured thereto, and as illustrated more particularly in Figs. 15 to 19, includes a hopper or box 110 to contain jelly or other confection, and a forcing mechanism for depositing charges of the same. The rear member of the box is in the present instance formed with an inclined back wall 29, side walls 30, and, continuous with the side walls, flanged triangular supporting plates 31 which by means of screws passing through their flanges are secured to cross-bars of the feeding frame. To the front face of the rear box member is bolted a front plate 32, said box member and plate being formed with recesses forming a dovetailed channel for the reception of a nozzle bar 33 and set screws 34 being employed to securely fasten the nozzle bar in position. An adjustable plate 35 which forms the front wall of the jelly box is secured to the front plate 32 by means of bolts 36 which clamp said plates tightly together against annular spacing collars or disks interposed between them, a space being thus left between the plates. The bolt holes for the bolts 36 are elongated to provide for vertical adjustment of the plate 35, its lower edge thus forming an adjustable gate through which the jelly can pass into the lower portion of the space between the plates 32 and 35, which serves as a forcing chamber. The adjustment of the plate 35 is effected through a yoke 37, the side members 38 of which are pivoted at their forward ends in lugs 39 formed upon the front plate 32. The side members 38 rearwardly of the lugs 39 are pivotally connected with posts 40 extending upwardly from the plate 35, and the stem 41 of the yoke is arranged to be clamped at any desired position of adjustment to a clamping bracket 42 fixed to the rear wall of the hopper.

Interposed between the plates 32 and 35, and arranged to reciprocate vertically is a flat plate 43 constituting a plunger or piston for forcing charges of jelly trapped in the chamber below said plate out through the nozzles of the bar 33. It will be understood that the jelly or other confection which is to be deposited by this mechanism must be sufficiently thin to run through the gate under the plate 35 by gravity, the adjustment of the plate determining the size of the deposits. In the operation of the machine the plunger 43 is lifted above the gate opening while a supply of jelly runs into the space below the plunger, and then descends past the opening to force charges out through the nozzles onto the top of the row of cakes in alinement with them, after which it ascends and the operation is repeated. To provide for these movements a flat bar 44 is riveted to the front of the plunger 43, such bar being housed in a channel formed to receive it in the front plate 32, a suitable vent for equalizing pressure in the space below the end of the bar being provided. One end of a link 45 is pivoted to the top of this bar, the other end being pivoted to a rocking lever 46. This lever 46 is pivoted intermediate its length on a fixed part of the box casing, in the present instance on a pivot stud 47 projecting inwardly from a plate 48 which is bolted to the front plate 32, spacing blocks being used to separate the plates a sufficient distance to accommodate the stud 47 and permit the lever to pass between such plates. By means of connections hereinafter described the lever 46 is rocked to raise and lower the plunger.

As in the machines described in my prior pending applications, the main depositing mechanism comprises two tanks 200 and 207 for two different varieties of confections, and two forcing mechanisms connected with the two tanks and acting to force the confections out through two sets of depositing nozzles 217 and 218 respectively associated therewith, and concentrically arranged. In the present instance the two depositing mechanisms are alike except in size, and each mechanism includes a flat rectangular forcing chamber extending across the machine and communicating by a port 216 with its associated tank and at its bottom communicating through a series of ports with all of the nozzles associated with it. The top of each forcing chamber is formed by a vertically reciprocating flat plunger or piston 223 and a supply valve 224 and the series of nozzles associated with it is controlled by a horizontal shut-off valve 225.

The mechanism by which nut kernels or wafers are placed on top of the deposits of confection made by the forcing mechanism just described need not vary from that described in my prior application filed August 12th, 1916, No. 114,571, and illustrated in the drawings of the present application. Briefly, this mechanism may be conveniently mounted in a supplemental frame 301, and comprises a second feed table 316 arranged over the front portion of the transfer belt 2, above which, at the end of such table nearest the end of the machine, is arranged a second supply or distributing table 317, in which is mounted a reciprocating trap or shutter 318 arranged to drop successive rows of cakes (or nut kernels, as the case may be), arranged thereon by an attendant onto the surface of the feed table 316; see Figs. 2 and 5. By means of a feeding frame consisting of a connected set of notched cross-bars 329 mounted to be lifted and also slide horizontally so as to have a four-way movement the rows of the wafers are intermittently moved from the supply table toward the center part of the machine, that is, in the direction of the depositing nozzles and in the opposite direction to the movement of the feed belt. A bail 324 is pivoted to the outer end of the feeding frame to operate the shutter 318 and draw the rows of cakes successively into the path of the adjacent cross bar 329. The end of the feed table 316 nearest the center of the machine is equipped with a reciprocating plate or slide 330 lying immediately beneath it and onto which the rows of cakes are successively moved by the adjacent crossbar of the feeding frame, such plate 330 being projected beyond the table at the end of the feeding stroke of such feeding frame. A rising and falling transfer frame 331 is slidingly mounted in the supplemental frame 301, this transfer frame being formed with a lower cross-bar equipped with groups of needles and arranged to reciprocate in the path of the plate 330. The transfer frame is actuated by a suitably shaped cam 359 to descend from uppermost position to a point at which the needles will impale a row of cakes at the time on the plate 330; then ascend slightly while the plate recedes;

then descend to lowermost position to deposit the cakes on the top of the deposits of confection on top of a row of cakes at the time in alinement with them on top of the transfer belt and immediately over the crossbar 6 of the belt-lifting frame, such frame and belt then being in uppermost position; and then ascend to uppermost position again. A stripper frame 341 carrying a row of stripper tubes surrounding said needles is slidingly mounted in said transfer frame, and automatically given relative downward movement against spring pressure normally holding it raised, to strip the cakes from the needles near the conclusion of the downward stroke of the transfer frame, through the contact of one end of a rocking lever 349 pivotally mounted on links 345 through which the transfer frame is operated with an adjustable disk 348 carried by the supplemental frame 301, the other end of the lever being connected with the stripper frame.

Forwardly of the mechanism for operating on nut kernels or wafers carried by the supplemental frame 301, and above the delivery belt, is arranged the mechanism for sprinkling shredded or grated material on the wafers. This consists of a box or hopper 54 extending transversely of the belt and slidably mounted upon a frame having posts or standards 55 secured to the side frames of the machine, so that it can be lifted upwardly off the frame. The bottom of the box consists of a screen or grating 56, the grating being preferably removable so that interchangeable gratings having meshes of different sizes may be used. Within the box and immediately above the grating is arranged a reciprocating agitator 57 consisting of a flat bar secured to a pair of rods 57ª arranged to slide in holes formed at the opposite sides of the box. Carried by the opposite ends of the bar 57 are slotted blocks 58, the slots in which are engaged by a swinging bail 59 through which the agitator is reciprocated. This bail is pivoted in bearings near the top of the opposite ends of the box, and the end of the bail at the left-hand side of the machine is provided with a depending rock-arm 60 through which it is oscillated by means which will later be described.

The connection for operating the various elements of my improved machine will next be described. The power shaft 143 of an electric motor by which the machine is designed to be driven communicates power through a belt 144 and sprocket and chain reducing gearing 145 to a shaft 149, which, as hereafter will be seen, communicates power to the mechanism which is mounted on the supplemental frame 301. Through a second sprocket and chain reducing gearing a shaft 151 is driven, and an elliptical gear wheel 152 secured to said shaft and meshing with an elliptical gear wheel 153 secured to a shaft 154 serves to drive the latter with a periodically variable speed, see Figs. 1, 7 and 8. Through the shafts 151 and 154 the moving parts above mentioned, except those on the frame 301, are actuated.

First describing the parts actuated by the shaft 154, the belt-lifting frame 4 is supported and reciprocated in the following manner: Secured to the side bars 103 of the feed table, near its forward end, are a pair of depending bearing brackets 8, in which is pivotally mounted a rock-shaft 9 carrying a rock-arm 10 equipped with a cam roller 11 arranged to coöperate with a cam 12 fixed to the shaft 154 before mentioned, see Fig. 9. The rock-shaft 9 also has secured to it a pair of lifting arms 13, one near each side of the machine, which arms are pivotally connected with the lower ends of the depending side portions of the slides 4, such slides being guided in their sliding movement by a pin-and-slot connection with a pair of brackets 14 secured to the side bars of the feed table adjacent the depending portion of such slides. Since the rock shaft 9 is carried by the feed table, the vertical adjustment at the front end of the table by means of the adjusting screw 71 will effect a simultaneous adjustment of the lifting frame. The lifting frame 130 which carries the sliding feeding frame 139 is raised and lowered, see Fig. 6, through a cam 181 on the shaft 154, a bell-crank lever 182 carrying a cam roller, a connecting rod 136 connected to a rear pair of bell crank levers 133 which by connecting rods 131ª are connected to a similar front pair of bell cranks 131, the bell cranks 131 and 133 being pivotally connected to the frame 130. The feeding frame 139 is reciprocated horizontally, see Fig. 1, through a crank arm 155 on said shaft 154 which is connected by a pitman 156 with a rocking frame 157, the top of this frame being connected by a rod 183 with a lever 184 adjustably connected with a rock shaft 178 carrying a pair of rock arms connected by links 189 with said frame 139.

The rocking frame 157 also serves for the actuation of the drum of the transfer belt and that of the delivery belt; the former through a rod 162 connected to a rocking lever 162ª, a second connecting rod 162ᵇ and pawl and ratchet mechanism operated thereby, and the latter through a rod 192 connected to a lever 193 carrying a pivoted pawl adapted to coöperate with a ratchet upon the feed drum 191 of the delivery belt, both mechanisms serving to translate the oscillating movement of the frame 157 into an intermittent rotary movement of the drums.

The shaft 151 actuates the plungers and supply and shut-off valves of the main depositing mechanisms, and the plunger of the supplemental or additional depositing mechanism, and also actuates the agitator of the mechanism for sprinkling shredded material on the wafers. The plunger of the main mechanism of larger capacity, the parts of which may conveniently be distinguished by the term marshmallow, is reciprocated through a pair of eccentrics 229 mounted on said shaft 151 and connected to arms 230 which are pivoted to rocking adjusting frames 231, see Fig. 6, the adjusting frames being connected by a pair of rods 238 to a sliding cross bar 239 to which are pivoted a pair of depending links 241 secured to the top of the plunger. The marshmallow supply valve is operated through a cam disk 242 on said shaft 151 coöperating with a roller on a rocking adjusting frame 244, see Figs. 1 and 4, which frame is connected by a rod 247 with a crank 248 on a rock-shaft 249 provided with a pair of rock arms 250 pivoted to a pair of links 251 which are in turn pivoted to the ends of the supply valve. The marshmallow shut-off valve is actuated by means of a cam disk 252 which coöperates with a roller on a rocking lever 254, see Figs. 1 and 4, pivotally connected by a rod 255 with a crank 256 on a rock shaft having a pair of rock arms 258 which are pivotally connected with the ends of such valve.

The plunger and valves of the small or jelly depositing mechanism are operated by three cam disks secured to a sleeve 260 which is adjustably secured to the shaft 151, in order that the timing of the jelly depositing mechanism may be varied with respect to the marshmallow depositing mechanism, see Figs. 8 and 9. The jelly plunger is operated through the cam slot 263, which engages a cam roller carried by a rocking adjusting frame 273 which is pivotally connected by a rod 275 with a crank arm 268 on a rock shaft 269, this rock shaft carrying a pair of rock arms 270, pivotally connected to a pair of links 272 which are pivoted to said plunger, see Fig. 7. The jelly supply valve is operated through the cam slot 264 which coöperates with a roller carried by a rocking adjusting frame 266, which frame, through a pivoted connecting rod 267, rocks a crank 276 fixed to a shaft 277 equipped with a pair of rock arms 278 pivotally connected with the ends of the supply valve. The cam slot 262 controls the jelly shut-off valve through a cam roller carried by a rocking lever 279, which lever, through a pivoted connecting rod 280, rocks a crank 281 fast on a rock shaft 282 which carries a pair of rock arms 283 pivoted to the ends of said shut-off valves.

The plunger of the supplemental or additional depositing mechanism is operated through the medium of an outside cam 49 which is secured to the periphery of the cam disk 242 on the shaft 151, above mentioned. A rocking lever 50 intermediately pivoted upon the shaft 169 carries at one end a roller 50$^a$ adapted to coöperate with said cam 49, the other end being pivotally connected by a rod or link 51 and a pivot block 51$^a$ with the end of the rocking lever 46 of the supplemental depositing mechanism, see Figs. 1 and 8. It is obvious that as the feeding frame 139 and the supplemental depositing mechanism are raised, the lever 46 will be rocked to raise the plunger 43 through the reaction of the cam roller 50$^a$ against the periphery of the cam disk 242 (with which it is at the time in contact), and the restraint of the connections intermediate such cam roller and the lever 46. The plunger will thus be maintained in raised position while the frame 139 and hopper travel backward, after which as the frame and jelly box descend, the cam 49 will coöperate with the lever 50 to still maintain the plunger elevated during the descending movement of the frame and the first part of its forward stroke, the cam roller immediately afterward running down off the cam 49 to cause a quick downward movement of the plunger and expulsion of jelly through the nozzles while the hopper and frame and cakes are moving forward in unison; these movements being repeated so long as the machine continues in operation.

By means of a sprocket wheel 61 on the shaft 151, a sprocket chain 62 and a sprocket wheel 63 mounted on a shaft 64 journaled at its opposite ends in the side frames of the machine, and a stepped cone pulley 65 connected by a belt 66 with a reversely stepped pulley 67 on a second shaft 68, see Figs. 1, 2 and 20, said latter shaft is driven at a speed determined by the position of engagement of said belt. A crank shaft 69 on the shaft 68 at the lefthand side of the machine is connected by a pitman 69$^a$ with the lower end of an oscillating lever 72, the upper end of said lever being provided with a pin which engages a slot formed in the lower end of the depending rock arm 60, before mentioned. The change speed gearing afforded by the stepped cone pulleys, in connection with the interchangeable gratings 56 of different size meshes, adapt the machine to operate upon grated or shredded material of different degrees of comminution, and deposit coatings of different degrees of thickness, as may be desired.

The moving parts of the cake-transfer mechanism mounted in the supplemental frame 301 are driven through a sprocket chain 351 which is driven by a sprocket wheel 350 secured to the shaft 149 before mentioned, see Fig. 1. This sprocket chain passes around idler sprocket wheels 352 and 353 and drives a sprocket wheel fixed on a shaft 354 rotatably mounted in the supplemental frame 301, see Fig. 11. The shaft 354 carries a cam disk 359 arranged to coöperate with a roller carried by an arm 60 having a connection cushioned in one direction with the rock shaft 43, said rock shaft being arranged to raise and lower the transfer frame 331 through a pair of rock arms 344 and links 345 pivoted to such arms and frame, see Figs. 1 and 10.

The shaft 354 also carries two pairs of lugs 382 and 383 acting in different planes upon parts of a pair of hook-shaped swinging cams 384 pivotally connected with the ends of the plate 330 to reciprocate it, see Fig. 10.

The feeding frame 327 is mounted to slide on rollers 381 carried by the ends of rock arms 380 secured to the opposite ends of a pair of rock shafts 375 and 379, see Fig. 11. These shafts carry arms connected by a link 377 so that they will rock in unison, and the shaft 375 is rocked by means of a cam 373 secured to the shaft 354 arranged to coöperate with a cam roller on a rock arm 374 secured to said shaft 375. The sliding movement of the frame 327 is imparted to it by a wrist pin on the cam disk 359, a pitman rod 367, crank 368 on rock shaft 369 and links 372 pivotally connected to said frame and rock arms 371 on said shaft; see Figs. 1 and 2.

The plate 1, before mentioned, is slidably mounted at the front end of the feed table 102, and is formed with a rearward extension 1ª, also slidably supported, which is equipped with a depending pivot block. This plate is reciprocated at the proper intervals by means of a cam disk 20 secured to the shaft 154 and formed with a suitably shaped cam groove arranged to coöperate with a cam roller mounted intermediate the ends of a rocking lever 21, which lever is pivotally hung on the rock shaft 169 before mentioned. The lower end of this lever is pivoted to a connecting rod 22 connected to one end of an intermediately pivoted lever 23, the other end of such lever being connected by a link 24 with the depending pivot block on the rearward extension of the plate 1 before mentioned.

In the continuous operation of my improved machine in the manner hereinbefore outlined, the timing of the various parts is such that the rows of cakes fed by attendants from the supply table 111 and moved forwardly step by step, are successively transferred by the forward notched bar of the feeding frame from the forward end of the table 102 onto the reciprocating plate 1 in alinement with the depositing nozzles. The plate is then withdrawn while the feeding frame remains stationary, and the cakes drop a short distance onto the top of the transfer belt, which at the time is in uppermost position closely adjacent the plate, the V-shaped notches of the front bar 139ª serving to accurately position the wafers as the plate 1 moves backward under them and they are scraped off onto the belt. The forcing mechanism now operates to deposit the desired charges of confection on the goods, the belt dropping at the conclusion of their forcing action to break the charge from the stream connected with the nozzle, the action of the depositing plungers and valves being such as to simultaneously suck back the stream slightly, to facilitate the making of a sharp break in the flow. Meanwhile, as soon as the plate 1 is withdrawn, the gang of notched feeding bars is drawn backward and at the same time lifted to a position above and back of the rows, whence they fall to a position just above the surface of the table and move forwardly again to shift all the rows and transfer the foremost row of cakes onto the plate 1, as already described. After the stream of confection is broken and the deposit completed on the wafers, the transfer belt travels forward while it is raising from lowermost position to the position first above-mentioned, closely adjacent the slide or plate 1, ready to receive the row of wafers dropped upon it when such plate is withdrawn under the feed table.

As shown in Figs. 12 and 13 the reciprocating plate which coöperates with the front cross-bar of the feeding frame to drop the front row of wafers onto the transfer belt may be of such dimensions as to serve as a feeding table, the timing and length of stroke being modified to cause the cross-bars of the feeding frame to clear the wafers and produce a proper feeding movement. In the modified construction shown in said figure, a sheet of metal 105ª forming the feed table is mounted to slide upon strips 52 secured to the cross-bars 104 of the table frame, between guide-blocks 104ª also secured to such cross-bars. The top end of the lever 23ª,— operated through connections similar to those by which the lever 23, before mentioned, is operated,—is arranged to coöperate with a pair of blocks 53 secured to a longitudinal strip 105ᵇ secured centrally to the under side of the feed table 105ª to impart a reciprocating motion to such table. In this modified construction the operating cam is so formed as to draw the table backwardly while the feeding frame temporarily remains stationary in forward position, and move such table forwardly again in advance of the forward movement of the feeding frame.

Not only is the impervious polished metallic surface of the feed table 105 (or 105ª) a more sanitary surface along which to feed the cakes, and a far easier surface to keep clean than the more or less porous canvas belt of my prior machines, but it has the advantage of not crumbling or abrading the lower surface of the cakes being operated upon, and also, because of the slight frictional resistance offered, that of obviating a certain tendency to roll, or tumble along which is to some extent exhibited by the canvas feeding surface, particularly when the belt has been soiled by some of the confection becoming smeared over its surface, as is liable to accidentally occur sometimes, or as is the case when the belt has been washed and is still somewhat damp. It will be seen that in my present construction, the cakes are dropped directly onto the belt, and are carried along in the identical spots at which they are deposited until transferred to the delivery belt.

I claim:

1. In a depositing machine having forcing mechanism and depositing nozzles, a stationary feed table, a feeding frame having an upward and downward and also a backward and forward movement, a sliding plate arranged at the front end of said feed table and arranged to be reciprocated horizontally into and out of alinement with said depositing nozzles, said feeding frame being arranged to shift rows of cakes successively from said feed table onto said plate, and a rising and falling transfer belt arranged below said plate.

2. In a depositing machine having forcing mechanism and depositing nozzles, a stationary feed table, a feeding frame having an upward and downward and also a backward and forward movement, a sliding plate arranged at the front end of said feed table and arranged to be reciprocated horizontally into and out of alinement with said depositing nozzles, said feeding frame being arranged to shift rows of cakes successively from said table onto said plate, a transfer belt arranged below said plate, and a lifting frame including a cross-bar disposed beneath said belt and arranged to raise and lower the same.

3. In a depositing machine having forcing mechanism and depositing nozzles, a stationary feed table, a feeding frame having an upward and downward and also a backward and forward movement and having at its front a notched cross bar, a sliding plate arranged at the front of said table and arranged to be reciprocated horizontally into and out of alinement with said depositing nozzles, a transfer belt arranged below said plate, operating means for moving said frame forwardly to transfer a row of cakes from said table onto said plate and pause temporarily in forward position, and means for drawing said sliding plate backwardly to center the cakes and drop them onto the transfer belt.

4. In a depositing machine having forcing mechanism and depositing nozzles, a stationary feed table, a feeding frame comprising a connected gang of cross-bars at least one of which is notched, a sliding plate arranged at the front of said table and arranged to be reciprocated horizontally into and out of alinement with said depositing nozzles, a transfer belt arranged below said plate, operating means for giving said feeding frame an upward and downward and also a backward and forward movement to intermittently move the cakes forwardly in rows on the table and at each forward movement transfer the front row onto said sliding plate, and means for reciprocating said plate to drop the cakes onto the belt.

5. In a depositing machine having forcing mechanism and depositing nozzles, a stationary feed table, a transfer belt arranged under and adjacent the front end of said table, belt-lifting means mounted on said table and including a cross-bar disposed beneath said belt adjacent the front end of the table and beneath the depositing nozzles, and means for adjusting the front end of said table vertically.

6. In a depositing machine having forcing mechanism and depositing nozzles, a stationary feed table pivoted at its rear end, feeding means mounted on said table, a plate slidably mounted at the front end of said table, a transfer belt arranged under and adjacent the front end of said table, belt-lifting means mounted on said table and including a cross-bar disposed beneath said belt adjacent the front end of the table and beneath the depositing nozzles, and means for adjusting the front end of said table vertically.

7. In a depositing machine having forcing mechanism and depositing nozzles, a stationary feed table pivoted at its rear end, a transfer belt arranged under and adjacent the front end of said table, belt-lifting means having a pivotal support in said table and including a cross-bar disposed beneath said belt adjacent the front end of the table and beneath the depositing nozzles, and means for adjusting the front end of said table vertically.

8. In a depositing machine having a forcing mechanism and depositing nozzles, a stationary feed table pivoted at its rear end, a transfer belt arranged under and adjacent the front end of said table, belt-lifting means including a rock-shaft pivotally mounted in said table and rock-arms secured to said shaft and connected to a cross-bar arranged underneath said belt, adjacent the front end of the table and also including a rock-arm arranged to coöperate with a driven cam, and means for adjusting the front end of said table vertically.

9. In a machine of the character described and having forcing mechanism and a row of depositing nozzles and also having a row of cake transferring and depositing pins and an intermittently movable transfer belt arranged beneath said nozzles and pins, supporting and lifting means arranged underneath said belt in alinement with said nozzles and pins for raising and lowering such belt.

10. In a machine of the character described and having forcing mechanism and a row of depositing nozzles and also having a row of cake transferring and depositing pins and an intermittently movable transfer belt arranged beneath said nozzles and pins, a lifting frame for raising and lowering such belt including a pair of cross-bars arranged underneath said belt and respectively in alinement with said nozzles and pins.

11. In a machine of the character described and having forcing mechanism and a row of depositing nozzles and also having a row of cake-transferring and depositing pins and an intermittently movable transfer belt arranged beneath said nozzles and pins, a lifting frame for raising and lowering such belt comprising a pair of T-shaped slides slidably mounted in a stationary part of the machine, and a pair of cross-bars connecting the ends of the horizontal members of the slides and arranged underneath said belt and respectively in alinement with said nozzles and pins.

12. In a machine of the character described and having forcing mechanism and a row of depositing nozzles and also having a row of cake-transferring and depositing pins and an intermittently movable transfer belt arranged beneath said nozzles and pins, a lifting frame for rasing and lowering such belt comprising a pair of T-shaped slides, the vertical portions of which have a pin-and-slot connection with a stationary part of the machine, and a pair of cross-bars connecting the ends of the horizontal member of the slides and arranged underneath said belt and respectively in alinement with said nozzles and pins.

13. In a depositing machine having forcing mechanism and a row of depositing nozzles, a stationary feed table, a sliding plate arranged at the front of said table and in approximately the same plane, said plate being arranged to be reciprocated forwardly and backwardly into and out of alinement with said depositing nozzles, an intermittently movable rising and falling transfer belt arranged to be fed forwardly beneath said plate, means for feeding cakes from said table onto said plate while such plate is in alinement with the depositing nozzles and for holding the cakes against backward movement as the plate is shifted backwardly, means for holding said belt in uppermost position adjacent said plate as such plate is shifted backwardly and for then lowering and next raising said belt while a succeeding row of cakes is being fed onto said plate, and means for simultaneously giving said belt its intermittent forward feeding movement.

14. In a depositing machine having forcing mechanism and a row of depositing nozzles, a stationary feed table, a reciprocating plate slidably mounted at the front end of said table under said nozzles, a feeding frame comprising a connected gang of bars having an upward and downward and also a backward and forward movement and arranged to move the cakes forwardly in rows on the table and at each forward movement transfer the front row onto said reciprocating plate, a transfer belt having an intermittent feeding movement and arranged under the front end of said table, and means for intermittently lifting said belt vertically into proximity with said plate and lowering it again.

15. In a depositing machine, a stationary feed table, a transfer belt having an intermittent feeding movement arranged under and adjacent the front end of said table, feeding means for moving the cakes in rows along said table, means for intermittently transferring the cakes a row at a time onto said belt, forcing mechanism having a row of depositing nozzles and arranged to make deposits of confection on the rows of cakes during the period of idleness of the transfer belt, and means including a row of cake-transferring members arranged forwardly of the depositing nozzles for depositing cakes on top of the deposits of confection.

16. In a depositing machine, a stationary feed table, a reciprocating plate slidably mounted at the front end of said table, a feeding frame comprising a connected gang of bars the front one of which is notched, said frame having an upward and downward and also a backward and forward movement and being arranged to move cakes forwardly in rows on the table and at each forward movement transfer the front row onto said reciprocating plate, forcing mechanism having a row of depositing nozzles arranged above said plate, a transfer belt having an intermittent feeding movement and extending forwardly from under the feed table, means including a row of cake-transferring members for depositing cakes on top of deposits of confection made on cakes passing under the depositing nozzles, and a lifting frame for intermittently lifting said belt vertically into proximity with said nozzles and said cake-transferring members and lowering it again.

17. In a depositing machine having forcing mechanism and depositing nozzles, a sliding plate arranged to be reciprocated horizontally into and out of alinement with said depositing nozzles, a transfer belt arranged below and extending forwardly of said plate, a feeding frame arranged to move cakes forwardly into alinement with said nozzles and pause temporarily in forward position, and means for drawing said plate backwardly to center the cakes and drop them onto the transfer belt.

18. In a depositing machine having forcing mechanism and depositing nozzles, a stationary feed table having an impervious polished upper surface, feeding means arranged to slide cakes forwardly in rows along the surface of said table, a sliding plate arranged at the front end of said table and arranged to be reciprocated horizontally into and out of alinement with said depositing nozzles, said feeding means being arranged to transfer the rows of cakes successively from said feed table onto said plate, and a transfer belt arranged below said plate.

19. In a machine of the character described, a horizontally reciprocating feeding frame arranged to advance rows of cakes, and a depositing mechanism mounted upon said frame and arranged to make deposits of confection upon the cakes while moving in unison therewith.

20. In a machine of the character described, a feeding frame arranged to have a rising and falling movement, a depositing mechanism mounted upon said frame and including a reciprocating forcing member, and a connection intermediate said forcing member and a relatively fixed part of the machine, whereby said member will be reciprocated by the rising and falling movement of the frame.

21. In a machine of the character described, a feeding frame arranged to have a rising and falling movement and also arranged to reciprocate backwardly and forwardly and advance rows of cakes, a confection hopper mounted upon said frame, a reciprocating forcing member arranged to intermittently discharge charges of confection from said hopper, a pivoted lever mounted on said hopper and connected to said forcing member, said pivoted lever being also connected to a relatively fixed element of the machine, whereby it is given an oscillating movement as the hopper rises and falls.

22. In a machine of the character described, a feeding frame arranged to have a rising and falling movement and also arranged to reciprocate backwardly and forwardly and advance rows of cakes, a confection hopper mounted upon said frame, a reciprocating forcing member arranged to intermittently discharge charges of confection from said hopper, a pivoted lever mounted on said hopper and connected to said forcing member, a rotating shaft journaled in the stationary bearings in the machine frame, a cam secured to said shaft, a rocking lever operatively connected with said cam and also operatively connected with said pivoted lever on the hopper, whereby the rising and falling movement of the feeding frame and the rotation of the cam will exert a joint effect causing said forcing member to reciprocate.

23. In a machine of the character described, a confection hopper including a rear wall 29, side walls 30 and a front wall 32, said hopper being formed with an outlet channel and equipped with nozzles communicating with said channel, a sliding plate 35 spaced apart from the front wall and its lower edge forming a gate at the bottom of the confection chamber, said plate being secured to said front wall and the proximate sides of the plate and wall being in alinement with the sides of the outlet channel and forming therewith and with portions of the side walls a forcing chamber, and a plunger arranged to reciprocate in said chamber and acting to expel charges of confection.

24. In a machine of the character described, a confection hopper including a rear wall 29, side walls 30 and a front wall 32, said hopper being formed with an outlet channel and equipped with nozzles communicating with said channel, a sliding plate 35 spaced apart from the front wall and its lower edge forming a gate at the bottom of the confection chamber, said plate being secured to said front wall and the proximate sides of the plate and wall being in alinement with the sides of the outlet channel and forming therewith and with portions of the side walls a forcing chamber, means for adjusting said sliding plate vertically, and a plunger arranged to reciprocate in said chamber and acting to expel charges of confection.

25. In a machine of the character described, a confection hopper including a rear wall 29, side walls 30 and a front wall 32, a sliding plate 35 spaced apart from the front wall and its lower edge forming a gate at the bottom of the confection chamber, and means for adjusting said sliding plate comprising a swinging yoke formed with branches 38 pivoted at their front ends to said front plate and intermediately pivotally connected to said plate and with a stem 41 adjustably secured to a rearward portion of the hopper.

26. In a machine of the character described, means for feeding cakes in rows, confection depositing mechanism, means for depositing nuts and the like on top of the deposits of confection, and means for sprinkling shredded material on top of the confection and nut deposits.

27. In a machine of the character described, means for feeding cakes in rows, means for depositing charges of confection on the cakes, and means arranged forwardly of the depositing means for sprinkling grated material on cakes passing through the machine.

28. In a machine of the character described and having means for feeding cakes in rows, and means for depositing charges of confection on the cakes, means for sprinkling grated material on the coated cakes comprising a hopper extending across the machine and having a screen bottom, and an agitator arranged to stir the grated material over the screen.

29. In a machine of the character described and having means for feeding cakes in rows, and means for depositing charges of confection on the cakes, means for sprinkling grated material on the coated cakes comprising a hopper extending across the machine and having a screen bottom, and a plate arranged to be reciprocated adjacent the screen.

30. In a machine of the character described and having means for feeding cakes in rows, and means for depositing charges of confection on the cakes, means for sprinkling grated material on the coated cakes comprising a hopper extending across the machine and having a screen bottom, a plate and a pair of rods secured thereto, said rods being slidingly mounted in holes in the sides of the box adjacent the surface of the screen, and means for reciprocating said plate and rods.

31. In a machine of the character described and having means for feeding cakes in rows, and means for depositing charges of confection on the cakes, means for sprinkling grated material on the coated cakes comprising a hopper extending across the machine and having a screen bottom, a plate and a pair of rods secured thereto, said rods being slidingly mounted in holes in the sides of the box adjacent the surface of the screen and the ends of said plate being equipped with upstanding slotted members, and an oscillating bail arranged to engage said slotted members to reciprocate the plate and rods.

FERDINANDO G. SALERNO.

Witnesses:
LOUIS B. ERWIN,
ROBERT DOBBERMAN.